(12) United States Patent
Zakrzewski

(10) Patent No.: US 6,785,353 B1
(45) Date of Patent: Aug. 31, 2004

(54) SYNCHRONIZATION LOSS DETECTION IN A V.34 RECEIVER

(75) Inventor: Adrian Zakrzewski, Rockville, MD (US)

(73) Assignee: Telogy Networks, Inc., Germantown, MD (US)

( * ) Notice: Subject to any disclaimer, the term of this patent is extended or adjusted under 35 U.S.C. 154(b) by 617 days.

(21) Appl. No.: 09/656,506

(22) Filed: Sep. 6, 2000

(51) Int. Cl.[7] .............................................. H04L 7/00
(52) U.S. Cl. ...................... 375/357; 375/362; 375/368; 375/340; 370/504; 370/510; 370/513; 370/514
(58) Field of Search ............................... 375/354–375; 370/509–514

(56) References Cited

U.S. PATENT DOCUMENTS 5,509,020 A * 4/1996 Iwakiri et al. .............. 714/704
6,009,131 A * 12/1999 Hiramatsu .................. 375/354

* cited by examiner

*Primary Examiner*—Jean B. Corrielus
*Assistant Examiner*—Qutbuddin Ghulamali
(74) *Attorney, Agent, or Firm*—Warren L. Franz; W. James Brady, III; Frederick J. Telecky, Jr.

(57) ABSTRACT

A method for detecting synchronization loss of the trellis minimum path metric in V.34 modem communications. The invention detects synchronization loss due to bit inversions in trellis decoding in transmitted digital frames due to a periodic inversion pattern that is used for superframe synchronization. The method provides synchronization loss detection by finding the ratio of moving averages for a series of data blocks to the average of a series of inverted 4D symbols located periodically in the beginning and center of received data frames.

16 Claims, 1 Drawing Sheet

SYNCHRONIZATION LOSS DETECTION IN A V.34 RECEIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

ITU-T recommendation V.34 are standards for a modem operating at data signaling rates of up to 33,600 bits/s for use on the general switched telephone network and on leased point-to-point 2-wire telephone type circuits. The standard utilizes quadrature amplitude modulation for each channel with synchronous line transmission at selectable symbol rates including the mandatory rates of 2400, 3000, 3200 symbols/s and the optional rates of 2743, 2800 and 3429 symbols/s. The standard may use trellis coding for all data signaling rates. Trellis encoding is a method for improving noise immunity using a convolutional coder to select a sequence of subsets in a partitioned signal constellation. The trellis encoders used in the ITU recommendation are used in a feedback structure where the inputs to the trellis encoder are derived from the signal points.

Trellis coded modulation (TCM) is one of the coding standards recommended under the V.34 modem communications standard. Trellis codes using lattices of dimensions larger than two have been constructed and have several advantages. Two dimensional (2D) symbols are grouped in pairs to form four-dimensional (4D) symbol intervals. Multidimensional trellis code signals as a basis for signal constellations are a theoretical concept, since, in practice, multidimensional signals are transmitted as sequences of one or two dimensional signals. Doubling the constellation size reduces the minimum distance within the constellation, and this reduction has to be compensated for by the code before any coding gain can be achieved. Using a 4D signal set causes the constituent 2D constellations to be expanded by a factor of only square root of two, having half a bit of redundancy per 2D constellation.

The decoding operation comprises finding the correct path through the trellis that most closely represents the received binary sequence. The decoder finds a path for the received binary sequence that has the minimum Hamming distance from the received sequence. The iterative procedure accomplishing the decoding is the Viterbi algorithm. The algorithm uses forward dynamic programming to select the best, or minimum Hamming distance, path through a trellis. At each node, in the trellis, the only path retained is the best path, therefore limiting the number of retained paths at any time instant to the total number of trellis nodes at that time.

A TCM code is rotationally invariant if it contains the correct code sequence that gives transparent decoding to a phase rotation of the signal constellation. The decoder must be able to find a valid code sequence after rotation. The rotated TCM sequence must also map back to the same originally encoded bits of information as the unrotated sequence.

Representations of transmitted digital communications signal waveforms are expressed in a common analytical framework named the signal space. Signal space diagrams are graphs of digital signals as illustrated in two-dimensional vector format. Signal space diagrams are also called signal constellations. Signal waveforms can be sent with two-dimensional symbols, however a more efficient method is grouping 2D symbol intervals in pairs and sending them as 4D symbol intervals. Digital waveforms under the V.34 standard are sent using frames of digital symbols. A mapping frame consists of four 4D symbol intervals. A number of P mapping frames form a data frame. A data frame varies as 12, 14, 15, or 16 mapping frames depending on the symbol transmission rate from the encoder output. Depending on the symbol rate, seven or eight data frames (J) form a superframe. The duration of a superframe lasts approximately 280 ms. A superframe is the highest level entity in the V.34 framing definitions.

Bit inversions of the trellis encoder output are used for superframe synchronization purposes. An important function at a modem receiver is the synchronization process of the carrier frequency and phase synchronization as well as symbol timing synchronization on order for the receiver to operate. Synchronization is a relatively slow estimation process, and data detection a fast process, therefore usually those two operations are separated in real receiver implementations. The trellis encoder consists of a convolutional encoder which generates bit inversions for the purposes of superframe synchronization. Bit inversions are introduced in the 4D symbol interval in the beginning of each half data frame. The period of inversion is 16 when J=8 and 14 when J=7.

The bits at the beginning and middle of each data frame are inverted according to a periodic inversion pattern. The bit inversion pattern is a 90 degree rotation of the second 2D constellation point in the 4D symbol interval. The bit inversions continue throughout the encoding of the modulated signal stream. The inversions are performed by the transmitter, thereby causing the receiver to perform a reversal of the inversion pattern prior to decoding. The inversion pattern generator in the receiver and the reversal system in the receiver must be synchronized, otherwise a synchronization loss occurs.

The inversion patterns generally do not affect the distances in the path metric since the receiver should fully reverse the inversion prior to decoding. However, when a synchronization loss occurs, this loss introduces a measurable increase of the trellis metric. In most cases, this increase in the trellis metric is not noticeable by other error-detecting processes in the receiver, resulting in a reportedly good quality output from adaptive equalizer in the modem. However, the bits that are offset due to the synchronization loss from the expected symbol stream are decoded incorrectly. There is currently no method to detect the erroneously decoded bits derived from the synchronization loss since the receiver has no knowledge of content of the symbol stream that is being sent by the remote transmitter.

SUMMARY OF THE INVENTION

The present invention is a method to detect synchronization loss due to bit inversions in V.34 modem trellis decoding in a 4D transmitted symbol intervals due to a periodic inversion pattern that is used for superframe synchronization. Current technology provides no method to detect that the unsynchronized inverted bits are erroneous since the receiver can not map back to the originally unrotated bit sequence in the transmitter. The invention provides synchronization loss detection through comparing the moving averages of different sized block frames of data containing the inverted synchronization bits.

Modems sending packetized digital data under the V.34 format must maintain synchronization between the transmitter and receiver. To maintain synchronization, bits at the beginning and middle of each data frame are inverted by the transmitter. This method detects errors near frame locations containing the inverted bits by comparing moving averages of the minimum path metric for periodic user-defined groups of data blocks. The inversion slots in the data frames are periodic, appearing every first and sixth mapping frame.

For a data frame of twelve mapping frames, the detection method uses a mapping frame containing inverted synchronization bits as a first data block. The method then defines a second data block of six mapping frames. The first mapping frame of the second data block is the mapping frame of the first data block containing the inverted bits. The second data block also includes the next five mapping frames in series after the frame containing inverted synchronization bits. Synchronization loss is detected in a metric by creating a ratio of the average minimum path metric of the periodic series of mapping frames containing the inversion bits to the average of the periodic data block series of six mapping frames. The average of multiple frames in multiple periods having higher metrics will calculate to a higher average than a larger data block average, indicating a synchronization loss.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EMBODIMENTS

Figure 1:
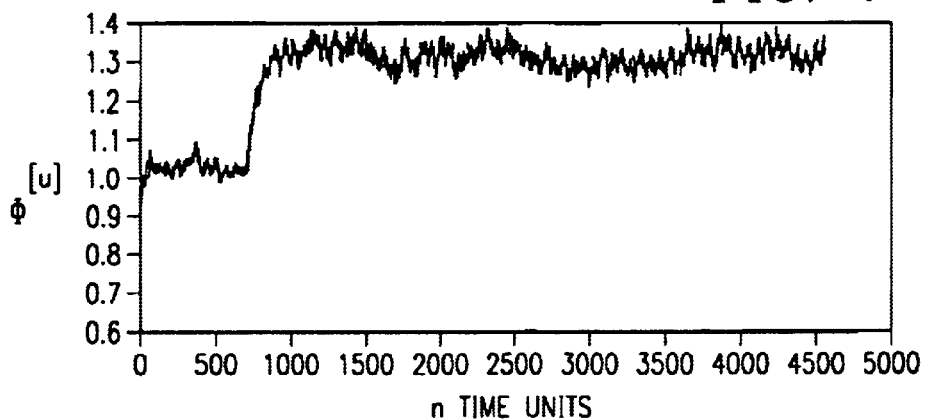
FIG. 1 is a graph illustrating synchronization loss using a ratio of moving averages of a modified block metric approach.

There is described herein a method to detect the erroneously decoded bits in a V.34 receiver derived from synchronization loss between a receiver and remote transmitter of the bit inversions of the trellis encoder output stream. In practice, signals most often consist of a sequence of identical, time-displaced waveforms, called pulses, that have some timing delay between successive pulses, called the signal period. The method of the preferred exemplary embodiment provides synchronization loss detection of a trellis path metric through finding the ratio of moving averages of minimum path metrics for user-defined data blocks to inverted 4D symbol path metrics located at periodic locations in received data frames.

An encoded symbol stream is represented in Table 1. The table represents the distribution of inverted 4D symbols as slotted within data frames. Data frames are illustrated sequenced in series within superframes from the beginning of a transmitted digital packetized communications signal arriving at a receiver.

TABLE 1

Distribution of 4D inversion slots

| i: | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| m: | 0 | 4 | 8 | 12 | 16 | 20 | 24 | 28 | 32 | 36 | 40 | 44 | 48 | 52 | 56 | 60 | 64 | 68 |
| j: | | | | | | | | | | | | | | | | | | |
| 0 | 2456 | | | | | 2 | 4 | 6 | | | | | 2 | | 4 | 5 | 6 | |
| 1 | | | | | | | | | | | | | | | | | | |
| 2 | | | | | | | 5 | | | | | | | | | | | |
| 3 | | | | | | | | | | | | | | | | | | |
| l: | 0 | | 1 | | 2 | | 3 | | 4 | | 5 | | 6 | | 7 | | 8 | |
| i: | 18 | 19 | 20 | 21 | 22 | 23 | 24 | 25 | 26 | 27 | 28 | 29 | 30 | 31 | 32 | 33 | 34 | |
| m: | 72 | 76 | 80 | 84 | 88 | 92 | 96 | 100 | 104 | 108 | 112 | 116 | 120 | 124 | 128 | 132 | 136 | |
| j: | | | | | | | | | | | | | | | | | | |
| 0 | 2 | | 4 | | | 26 | | | 4 | | 25 | | 6 | | | | | |
| 1 | | | | | | | | | | | | | | | | | | |
| 2 | | | 5 | | | | | | | | | | | | | | | |
| 3 | | | | | | | | | | | | | | | | | | |
| l: | 9 | | 10 | | 11 | | 12 | | 13 | | 14 | | 15 | | 16 | | 17 | | i=a mapping frame=four 4D symbols j=the 4D symbol interval 0 through 3 within a mapping frame m=the 4D symbol index=4i+j l=a user-defined data block for synchronization loss calculations As referenced, "i" refers to the running number of mapping frames in the series, the first mapping frame beginning at zero. The notation "j" is the number of the 4D symbol interval beginning with zero at the top of the data frame slot i=0 and adding down the slots in a mapping frame in the table to the last symbol in the first mapping frame noted as "3". The top of the next mapping frame i=1 is the 4D symbol number four, adding successively down the series of mapping frames. The notation "m" is the 4D symbol index that identifies the number and location of the 4D symbol illustrated at the top slot of each mapping frame in the series. The block series "l" notated underneath Table 1, beginning with l=0 is the slot and location of a block of frames that is defined by the user to use in the calculation of synchronization loss of the metric. As defined in the exemplary embodiment, a block l=two mapping frames. In table one, mapping frame zero, 4D symbol slot zero, the numbers 2, 4, 5, and 6 represent the initial 4D symbol slot for data frames P=12, 14, 15, and 16, respectively. The notations of similar identification numbers for the data frame symbol locations in later mapping frames represent bit inversions where synchronization loss can occur and increase the immediate 2D, or 4D, Hamming distance. The 4D symbols at the center slot and end slot of each data frame are inverted. For example, in data frame P=12 mapping frames, 4D symbols are inverted at i=6, i=12, i=18, i=24, and so forth as illustrated in Table 1. Synchronization loss can occur in the immediate 4D distance for indices m=0, 24, 48, 72, 96 . . . .

The encoded symbol stream is decoded through the minimum trellis path metric by Viterbi's maximum-likelihood algorithm. The maximum-likelihood receiver implies selecting a code word closest to the received word. Because there are $2^k$ code words, the maximum-likelihood decision involves storage of $2^k$ words and their comparison with the received words.

Figure 3:
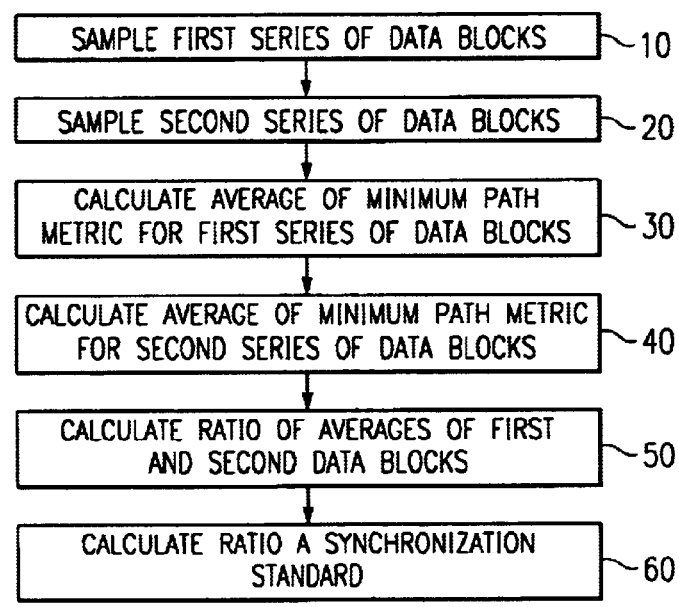
FIG. 3 is a flowchart illustrating a method to detect synchronization loss in a V.34 receiver.

Referring generally to the flowchart in FIG. 3, the method of the preferred exemplary embodiment detects synchronization loss through finding the ratio of moving averages 50 of minimum trellis path metrics for user-defined data blocks 10 that are a subset of a data frame to a moving average of minimum trellis path metrics for smaller data blocks 20 containing the inverted symbols located periodically within in each consecutive data frame.

Synchronization errors detected through user-defined blocks that are a subdivision of a data frame P and sized less than P begins with finding the minimum path metric for a block "1" on is Table 2. Table 2 is an example of the synch loss detection using a distribution of 4D inversion slots for the data frame P=12, as explained supra in Table 1. The frames, symbol intervals, and blocks in Table 2 are defined the same as Table 1. Table 2 illustrates the user-defined blocks of two mapping frames that are numbered below the tables, beginning with l=0. Locations of bit inversions for data frame P=12 are marked with an "x" on Table 2. These same inversion locations are reference in Table 1 with a "2" in the 4D symbol location slots.

Beginning with block l=0, v[l] is defined as the minimum trellis path metric for the entire block "l" of 4D symbol sequences. A variable w[n] is created from v[l] and is defined as a series of the same symbols within the 4D symbol intervals across successive blocks of the metric. In Table 2, location number 2, noted as "x" on Table 2, the first location is block 0, the second location is block 3, the third location is block 6, and so forth. The beginning of the series w[n] for symbol 2 at intervals of every third block correspond to Table 1 having symbol 2 at the beginning and middle of every data frame of P=12. The series w[n] is created from v[l] by down-sampling. In Table 2 for P=12 and a block size of 8, w[n]={v[0], v[3], v[6], . . . v[3n]}. A synch detected by this process when the average of w[n] 30 is significantly higher 50 than the average of v[l] 40, the minimum metric path for one block. When the four-dimensional signal set experiences a synch loss, the path metric increase that is measured in the v[l] average of each block is affected by each measurement of w[n] (or v[3n] in the example series). However, the increase in the average of v[l] is not as substantial as the increase of the average of the w[n] series of points. Therefore, the synch loss can be measured in terms of the ratio 50 of the average of w[n] compared to the average of V[n] 60.

The length of a trellis can be several hundred or thousands of time units, corresponding to continuous operation of transmitted digital waveforms to a receiver. Table 2 illustrates only the beginning sequence of a trellis code modulation in a receiver. To calculate the ratio 50 of the w[n] average 30 to the v[l] on a continuously flowing trellis 40, a moving average of the two values is utilized to detect the

TABLE 2

Distribution of 4D inversion slots for P = 12 and a block size of 8

| i: | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| m: | 0 | 4 | 8 | 12 | 16 | 20 | 24 | 28 | 32 | 36 | 40 | 44 | 48 | 52 | 56 | 60 | 64 | 68 |
| j: 0 | | | | | | | a | | | | | | | | | | | |
| 1 | | | | | | | | | | | | | | | | | | |
| 2 | | | | | | | | | | | | | | | | | | |
| 3 | | | | | | | | | | | | | | | | | | |
| l: | 0 | | 1 | | 2 | | 3 | | 4 | | 5 | | 6 | | 7 | | 8 | |

| i: | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| m: | 72 | 76 | 80 | 84 | 88 | 92 | 96 | 100 | 104 | 108 | 112 | 116 | 120 | 124 | 128 | 132 | 136 |
| j: 0 | a | | | | | | | | | | | | | | a | | |
| 1 | | | | | | | | | | | | | | | | | |
| 2 | | | | | | | | | | | | | | | | | |
| 3 | | | | | | | | | | | | | | | | | |
| l: | 9 | | 10 | | 11 | | 12 | | 13 | | 14 | | 15 | | 16 | | 17 |

As illustrated in the flowchart in FIG. 3, synchronization loss is detected in a metric by observing the average minimum path metric of a series of data blocks 30 and comparing them with the average of a series of inverted 4d symbols 40 found periodically in the beginning and middle of data frames, according to Table 1. For example, blocks without a higher metric value may be averaged with a block containing a higher metric point. The block containing a higher metric point may not significantly affect the average of many blocks without higher points. The average of multiple points in multiple periods having higher metrics will calculate 50 to a higher average than the block average, indicating a synchronization loss. Averaging metric paths over smaller period is preferred over larger periods to provide more averaged data with faster detection times of synchronization losses.

synchronization loss. The ratio of the moving averages of w[n] to v[n] is calculated as follows:

$$\Phi[n] = \frac{MA(w[n])}{MA(v[n])} = \frac{\frac{1}{N}\sum_{k=0}^{N-1} w[n-k]}{\frac{1}{M}\sum_{k=0}^{M-1} v[Tn-k]} = \frac{\frac{1}{N}\sum_{k=0}^{N-1} v[T(n-k)]}{\frac{1}{M}\sum_{k=0}^{M-1} v[Tn-k]}$$

MA is the moving average;
T is the down sampling ratio and depends only on the size of the V.34 data frame (P);
n is the block number corresponding to the symbol number being averaged;

k is the highest block number corresponding to the symbol number being averaged for the snapshot of the moving average;

N is the total number of blocks, corresponding to the symbol number being averaged, that are considered for the snapshot of the moving average;

M is the total number of user-defined blocks used in calculating the running average of the minimum path metric for each block.

Instead of a moving average, an alternative embodiment may also use an exponential average to accomplish synchronization loss detection.

Using the ratio result, φ[n] 50, the trellis encoder output is detected to be either synchronized or running with a synchronization loss. When φ[n]≅1, the moving average of the w[n] path metrics and the moving average of the block path metrics are the same or nearly the same, and the trellis encoder output is considered synchronized (60). If φ[n]>1, the size of the average of w[n] is significantly higher than the average of v[l] and a synchronization error has occurred (60).

To analyze how the increased block metric affects the moving average Φ[n], the following equation is utilized:

$$\Phi[n] = \frac{a+e}{a+\frac{e}{T}}$$

Variable "a" is the average in case of synchronization and e is the increase in the trellis path metric due to synchronization loss. The top half of the equation, "a+e" is the is synchronization error loss added to a single w[n] symbol point. The bottom of the equation "a+e/T" is the average of the w[n] points used in the moving window calculation, added to the combined synchronization errors of the same w[n] points, divided by the down-sampling ratio. In this method, Φ[n] theoretically depends only on the contribution due to the synchronization loss and in practice, has some residual value even in the case of full synchronization.

To analyze how the increased block metric affects the moving average Φ[n] from Table 2, the following equation is utilized:

$$\Phi[n] = \frac{a+e}{a+\frac{e}{3}}$$

The lower half the equation, "a+e/3", is the average of all three [n] points used in the example from Table 2 added to the three points' combined synchronization errors divided by three.

Prior to providing the ability to detecting if a synchronization loss has occurred through finding φ[n], a threshold must be set to determine how far from 1.00 that φ[n] must reach before a synchronization loss is determined to have happened 60. In determining a synchronization loss threshold, all four cases of P (12, 14, 15 and 16) must be considered along with all of the possible inversion shifts of the 2D constellation points. The parameters of T, N, and M can be varied to adjust a trade-off of the computational requirements placed on the system with the synchronization loss detection time.

A code parameter that can determine how many errors a code can correct and how many errors a code can detect is called the minimum distance. The Hamming distance is the distance between any two codewords w and v and can be denoted as d(w,v). For example, for w=(1100100) and v=(0010011), d(w,v)=d(w+v)=d(1110111)=6. The minimum distance for a code is given by finding the minimum distances for all codewords that are not equal to each other. The minimum probability of error in a decoding process relies heavily on the concept of how close a received vector is to a transmitted codeword. The decoder decodes the received vector as that codeword which is closest to the received vector in terms of Hamming distance. The Hamming distance between the transmitter and receiver inversion pattern also determines the amount of increase in Φ[n]. The Hamming distance depends on the time shift of the patterns and the period pattern 2J, which is shown on the following table:

TABLE 3

Hamming distance as a function of time shift

| shift | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| J = 7 | 4 | 6 | 6 | 4 | 4 | 6 | 6 | 6 | 4 | 4 | 6 | 6 | 4 | | |
| J = 8 | 6 | 6 | 6 | 6 | 6 | 8 | 6 | 8 | 6 | 8 | 6 | 6 | 6 | 6 | 6 |

An alternative exemplary embodiment uses a modified block metric approach. The following approach achieves a higher detection accuracy than the first approach. In the modified block metric approach, the average 30 of the decimated v[1], w[n]=v[Tn], is compared to 50 the average 40 of the decimated shifted v[1], w'[n]=v[Tn+d].

$$\Phi[n] = \frac{MA(w[n])}{MA(w'[n])} = \frac{\frac{1}{N}\sum_{k=0}^{N-1} w[n-k]}{\frac{1}{N}\sum_{k=0}^{N-1} w'[n-k]} = \frac{\frac{1}{N}\sum_{k=0}^{N-1} v[T(n-k)]}{\frac{1}{N}\sum_{k=0}^{N-1} v[T(n-k)+d]}$$

Measured results of this approach are graphed in FIG. 1. FIG. 1 is an x-y graph of synchronization loss occurring at an inverted 4D symbol interval. The moving average Φ[n] is graphed on the y-axis and the received signal level in time units is graphed on the x-axis. The waveform is in synch for the first approximately 600 time units and varies around 1.0. After 600 time units, the waveform loses synchronization and the moving average increases well above 1.0, varying between approximately 1.2 and 1.4.

Referring to Table 2, the variables for down-sampling ratio T=3 and shifted v[1] of d=1 are chosen for the modified block metric approach. Using these figures, v[3n+1] is an advantageous input to finding Φ[n] because w'[n] is not affected by the synchronization loss. Therefore, the increase in Φ[n] will be higher than the first moving average determination. This method results in an easier detection of the synchronization loss. Analyzing the increased block metric effects on the moving average Φ[n] from Table 2, the following equation is utilized for the modified block metric approach:

$$\Phi[n] = \frac{a+e}{a}$$

A final approach to finding the φ[n] ratio 50 is to subtract the average 30 of the decimated shifted v[1], w'[n]=v[Tn+d], from the moving average w[n] 40. This approach is defined in the formula:

$$\Phi[n] = MA(w[n]) - MA(w'[n]) = \frac{1}{N}\sum_{k=0}^{N-1} v[T(n-k)] - \frac{1}{N}\sum_{k=0}^{N-1} v[T(n-k)+d]$$

Figure 2:
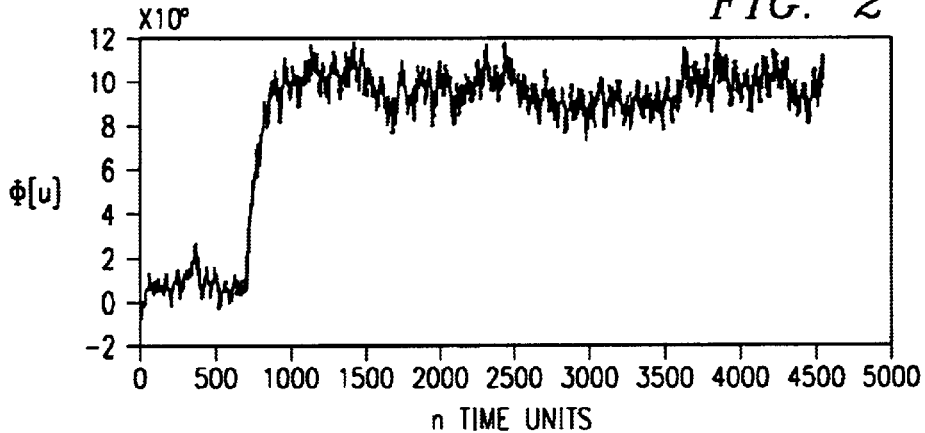
FIG. 2 is a graph illustrating synchronization loss using absolute values of moving averages of a modified block metric approach.

Measured results of this approach are graphed in FIG. 2. FIG. 2 is an x-y graph of synchronization loss occurring at an inverted 4D symbol interval similar to FIG. 1. The difference in scale between FIG. 1 and FIG. 2 is caused by FIG. 2 to graph the synchronization loss in measured values on the y-axis, instead of normalized values found in FIG. 1. However, both graphs have the same basic shape, illustrating a path loss somewhere between 500 and 1000 time units.

Analyzing the increased block metric effects on the moving average Φ[n] from Table 2, the following equation is utilized for the modified block metric approach subtracting the decimated shifted v[1]:

$$\Phi[n]=(a+e)-a=e$$

This approach is the preferred solution of the three, since theoretically Φ[n] depends only on the contribution due to the synchronization loss. In practice, it has some residual value even in the case of full synchronization.

The following code is an implementation of the synchronization loss detector provided herein:

```
#define BLOCK_SIZE    8
void SyncLossDetectorInit(int P) {
    syncLossCounter = BLOCK_SIZE;
    syncLossPeriod = 2*P;
    syncLossDetected = 0;
    m0 = 0;
    m1 = 0x7fffff;
}
void SyncLossDetector(ulong variance) {
    if(syncLossCounter < BLOCK_SIZE) {
        m1 += variance - (m1 >> 6);    /*geometric averaging of
        no-error slot */
        if( (m0 - m1) > SYNC_LOSS_THRESHOLD) )
            syncLossDetected = 1;
        syncLossCounter += syncLossPeriod;
    } else if(syncLossCounter < 2*BLOCK_SIZE) {
        m0 += variance - (m0 >> 6);    /*geometric averaging of
        error slot */
    }
    syncLossCounter -= 8;
}
```

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method for determining synchronization loss of digital communications signals in a V.34 receiver, comprising the steps of:
    averaging the minimum path metric for a first periodic series of data blocks containing bit inversions;
    averaging the minimum path metric for a second periodic series of data blocks containing said bit inversions and comprising fewer symbols than said first periodic data blocks;
    calculating a ratio of the average of the minimum path metric for said first data blocks with the average of the minimum path metric for said second data blocks;
    detecting an increase in the minimum path metric by comparing the deviation of said ratio from a synchronization standard.

2. The method of claim 1, wherein:
    said step of detecting an increase in the minimum path metric includes detecting synchronization loss as a deviation above a threshold in said averaged metric path ratio from said standard.

3. The method of claim 1, wherein:
    said steps of averaging the minimum path metrics include calculating moving averages of said first and second series of data blocks.

4. The method of claim 1, wherein:
    said steps of averaging the minimum path metrics include calculating exponential moving averages of said first and second series of data blocks.

5. The method of claim 1, wherein:
    said step of averaging said first series of data blocks includes data blocks containing fewer mapping frames than a data frame.

6. The method of claim 5, wherein:
    said step of averaging said first series of data blocks includes data blocks divided from data frames consisting of 12, 14, 15, or 16 of said mapping frames.

7. The method of claim 1, further comprising the steps of:
    calculating a decimated shifted average of the minimum path metric of said second data block;
    calculating a shifted ratio of said first averaged data block metric to said decimated shifted second data block;
    comparing said shifted ratio to a standard to detect synchronization loss.

8. A method for detecting synchronization loss of digital communications signals in a receiver, comprising the steps of:
    sampling a plurality of a first series of data blocks within said digital signals containing periodic symbol inversions;
    sampling a plurality of a second series of data blocks within said digital signals that contain said periodic symbol inversions and are a subset of said first set of data blocks;
    calculating an average of minimum path metrics of a plurality of said first series of data blocks;
    calculating an average of the minimum path metric of a plurality of said second series of data blocks;
    calculating a ratio by dividing the average of said first series of data blocks by the average of said second series of data blocks;
    comparing said ratio of averages with a synchronization standard to detect synchronization of said digital communication signals in said receiver.

9. The method of claim 8, wherein:
    said steps of averaging the minimum path metrics include calculating moving averages of said first and second series of data blocks.

10. The method of claim 8, wherein:
    said steps of averaging the minimum path metrics include calculating exponential moving averages of said first and second series of data blocks.

11. The method of claim 8, wherein:
    said step of averaging said first series of data blocks includes data blocks containing fewer mapping frames than a data frame.

12. The method of claim 8, wherein:

said step of averaging said first series of data blocks includes data blocks divided from data frames consisting of 12, 14, 15, or 16 of said mapping frames.

13. A method for detecting synchronization loss of digital communications signals in a receiver, comprising the steps of:

sampling a plurality of a first series of mapping frames within a plurality of data frames containing periodic inverted symbols used for superframe synchronization;

sampling a second series of mapping frames within a plurality of said data frames that are a subset of said first series of data frames contain said periodic inverted symbols used for superframe synchronization;

calculating an average of minimum path metrics of a plurality of said first set of mapping frames;

calculating an average of the minimum path metric of a plurality of said second series of mapping frames;

obtaining a ratio by dividing the average of said first set of data blocks by the moving average of said second set of data blocks;

comparing said ratio with a standard synchronized ratio to detect said synchronization loss.

14. The method of claim 13, wherein:

said steps of averaging the minimum path metrics include calculating moving averages of said first and second series of mapping frames.

15. The method of claim 13, wherein:

said steps of averaging the minimum path metrics include calculating exponential moving averages of said first and second series of mapping frames.

16. The method of claim 13, wherein:

said step of averaging said first series of data blocks includes data blocks divided from data frames consisting of 12, 14, 15, or 16 of said mapping frames.

* * * * *